H. J. NOTZ.
TRANSMISSION GEARING.
APPLICATION FILED NOV. 12, 1914.

1,148,710.

Patented Aug. 3, 1915.
3 SHEETS—SHEET 1.

Fig. 1.

Witnesses
Wynne Johnson

Inventor,
Henry J. Notz
By C. L. Parker, Attorney

H. J. NOTZ.
TRANSMISSION GEARING.
APPLICATION FILED NOV. 12, 1914.

1,148,710.

Patented Aug. 3, 1915.
3 SHEETS—SHEET 2.

Inventor
Henry J. Notz

Witnesses
Wynne Johnson

By C. L. Parker, Attorney

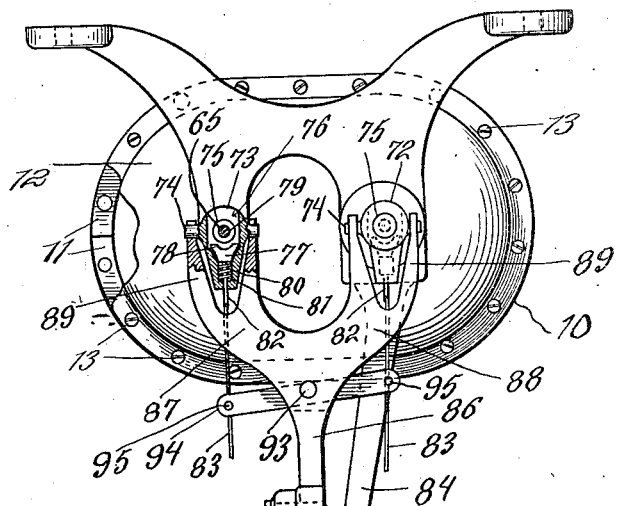
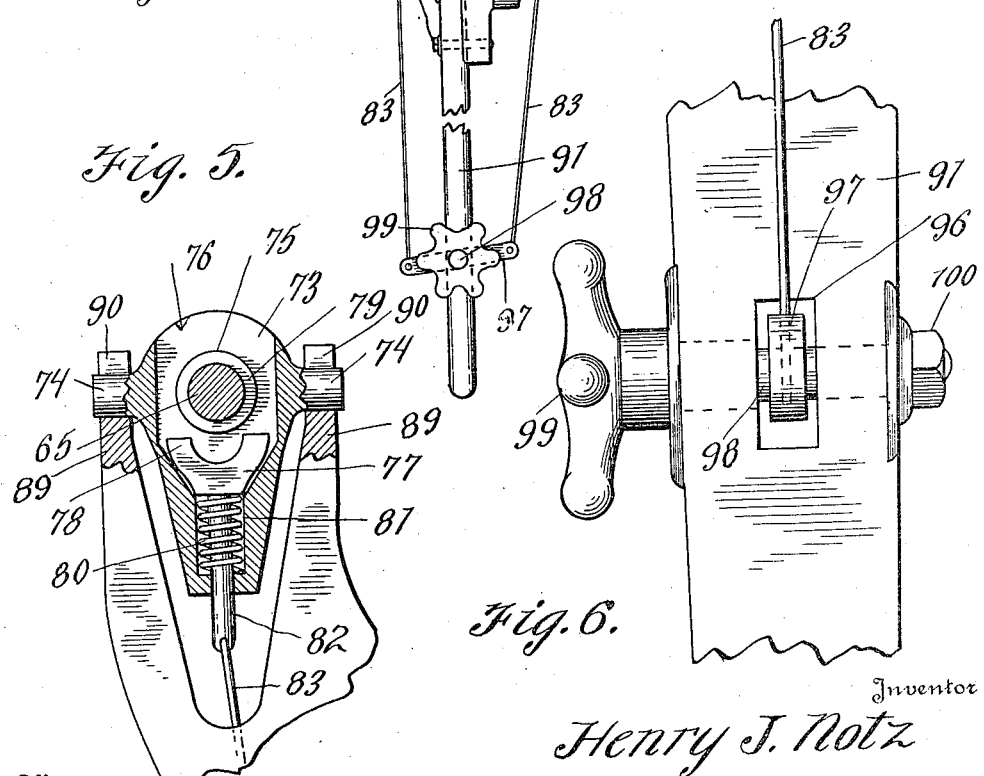

UNITED STATES PATENT OFFICE.

HENRY J. NOTZ, OF CINCINNATI, OHIO.

TRANSMISSION-GEARING.

1,148,710.

Specification of Letters Patent.

Patented Aug. 3, 1915.

Application filed November 12, 1914. Serial No. 871,752.

*To all whom it may concern:*

Be it known that I, HENRY J. NOTZ, a citizen of the United States, residing at Cincinnati, in the county of Hamilton and State of Ohio, have invented certain new and useful Improvements in Transmission-Gearing, of which the following is a specification.

My invention relates to improvements in combined variable speed and reverse transmission gearing.

An important object of the invention is to provide transmission gearing of the above mentioned character, having means whereby the same may operate in forward or reverse directions at a plurality of speeds.

A further object of the invention is to provide means for shifting the gearing from one speed to another while the same is operating in either direction, without reversing the gearing.

A further object of the invention is to provide means for shifting the reversing mechanism to cause the gearing to drive in opposite directions while the variable speed driving means is at neutral.

A further object of the invention is to provide novel and simple means for moving the shifting rods or shafts.

A further object of the invention is to provide transmission gearing of the above mentioned character, which is simple in construction, inexpensive to manufacture, convenient in use, will occupy comparatively little space, and is not liable to derangements.

Other objects and advantages of the invention will be apparent during the course of the following description.

Figure 2:
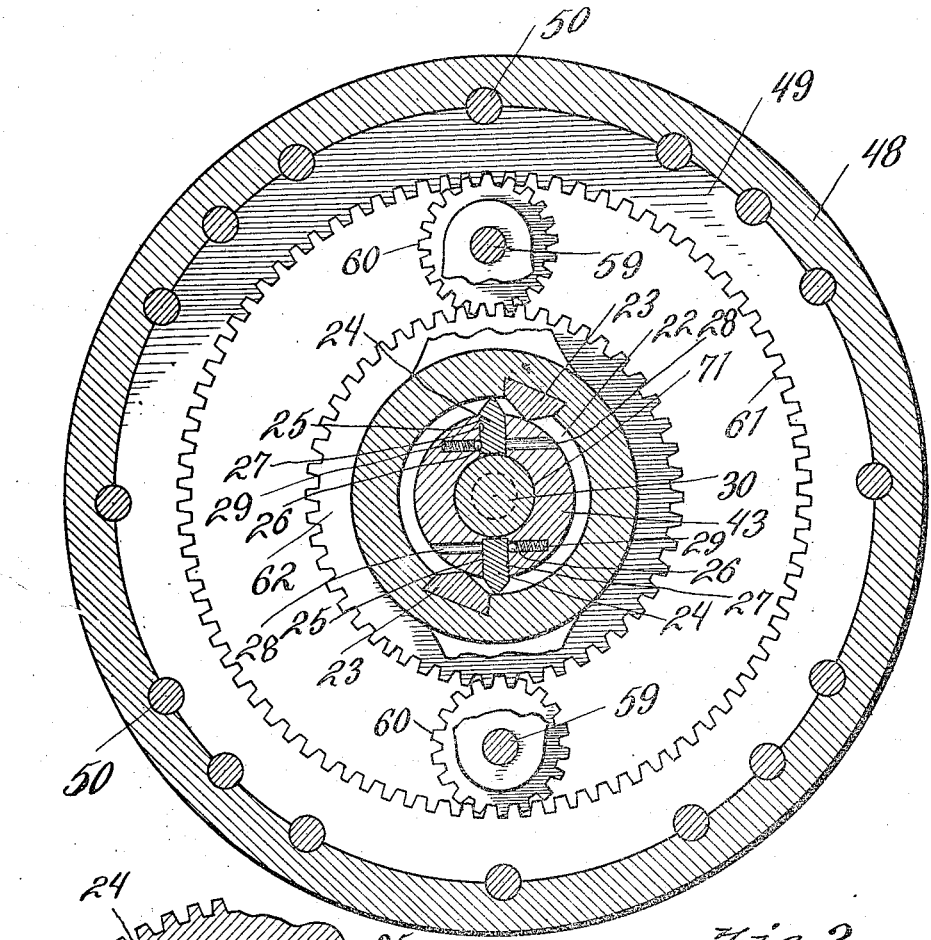
Figure 3:
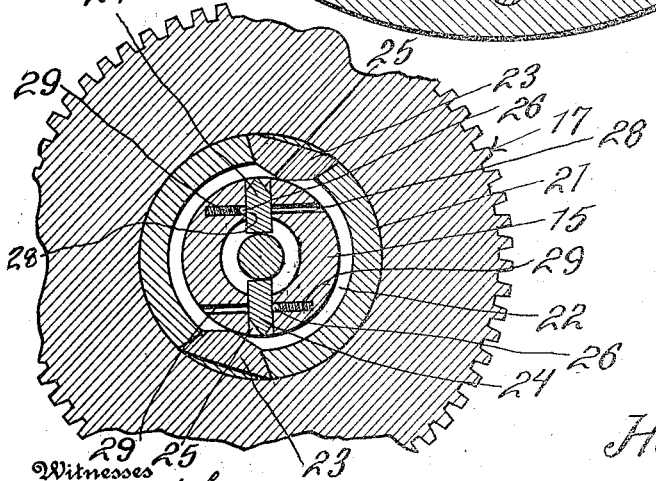

In the accompanying drawings forming a part of this specification and in which like numerals are employed to designate like parts throughout the same, Figure 1 is a central horizontal longitudinal sectional view through transmission gearing embodying the invention, Fig. 2 is a transverse sectional view taken on line 2—2 of Fig. 1, Fig. 3 is a similar view taken on line 3—3 of Fig. 1, Fig. 4 is a side elevation of a shifting fork or lever, Fig. 5 is an enlarged detail section through the upper end of the fork, and, Fig. 6 is a side elevation of a hand wheel or knob.

In the drawings, wherein for the purpose of illustration is shown a preferred embodiment of my invention, the numeral 10 designates a gearing casing as a whole, the same being preferably formed in upper and lower sections 11, which are bolted or otherwise rigidly secured together. One end of the casing 10 is closed by a head 12, rigidly connected therewith by bolts 13 or the like.

Journaled through suitable bearings 14 carried by the casing 10, is a tubular driving shaft 15, having a driving pulley or member 16, rigidly connected therewith. This driving pulley is rotated in one direction by a single belt, receiving its power from an engine or the like. It is to be understood that the driving shaft 15 may be continuously driven in the one direction by any other suitable means.

Arranged within the gear casing 10 are low, intermediate, and high speed driving pinions or gears 17, 18, and 19, which are rotatably or loosely mounted upon the driving shaft 15, and are preferably provided with packing or bushing rings 20, as shown.

As more clearly shown in Fig. 3, each of the gears 17 to 19 embodies an inner hub member 21, rigidly secured thereto. This hub member is provided with an interior annular groove 22, into which projects clutch elements or lugs 23, rigidly secured to the hub member 21, and preferably having a dove-tail connection therewith. The inner or free ends of these clutch elements or lugs 23 are preferably beveled, as shown. Arranged in coöperative relation with the clutch elements or lugs 23, are preferably reciprocatory clutch elements or bolts 24, disposed within radially extending openings 25, formed through the driving shaft 15. The outer ends of these bolts 24 are beveled, as shown, whereby when the same are released, by means to be described, the beveled ends of the lugs 23 will automatically shift the bolts 24 to the inner or inactive position, these bolts being detachably held in such inner position by means of balls 26, adapted to enter recesses 27, in the bolts 24. The balls 26 operate within openings or channels 28, and are moved toward the bolts 24 by the springs 29, as shown. It is obvious that when the bolts 24 are moved radially outwardly, and positively locked in such position, the same by being disposed in the path of travel of the lugs 23, will lock the pinion to the driving shaft.

The numeral 30 designates a longitudinally movable clutch actuating shaft, preferably extending through the tubular driving shaft 15. The longitudinal movement of the shaft 30, in either direction, is positively limited by stop-elements or rings 31 and 32, rigidly attached thereto, and adapted to engage respectively with a stationary stuffing box 33 and a bearing 34, as shown. The shaft 30 extends inwardly of and in proximity to the reciprocatory clutch bolts 24, and is provided with expanding portions or members 35, 36 and 37, adapted to engage respectively with the clutch bolts carried by the pinions 17, 18 and 19, as shown. When the shifting shaft 30 is in the neutral position, all of the expanding members disengage the clutch-bolts, whereby all of the pinions are free to revolve upon the shaft 15. In Fig. 1, the shaft 30 is shown moved from the neutral position, to bring the expanding member 36 into engagement with the bolts 24, forcing the same outwardly whereby the intermediate pinion 18 is locked to the shaft 15. It is obvious that by moving shaft 30 to the left, the expanding member 35 will engage bolts 24 of the pinion 17, whereby pinion 17 is locked to the shaft 15 while pinion 18 is unlocked therefrom. When the shaft 30 is moved to the right, expanding member 37 will engage bolts 24 of the pinion 19, whereby pinion 19 is locked to the shaft 15 while pinions 18 and 17 are free to rotate thereon.

As more clearly shown in Fig. 1, the shifting shaft 30 is provided with a plurality of openings or notches 38 to receive elements or balls 39, movably mounted within openings 40 formed through the driving shaft 15, and urged inwardly by springs 41. The means to longitudinally move the shaft 30 will be described hereinafter.

The gear casing 10 is provided with bearings 42, rotatably receiving a tubular driving shaft 43, which is incapable of partaking of perceptible longitudinal movement. Arranged within the casing 10 and rigidly mounted upon the shaft 43 are low, medium, and high speed pinions or gears 44, 45 and 46, engaging respectively with gears 17, 18 and 19, as shown.

The numeral 47 designates a power distributing member or pulley, which includes the reversing mechanism. The member 47 is in the form of a pulley casing, and comprises casing-sections 48 and 49, arranged in end to end relation and rigidly connected by means of bolts 50 or the like. The casing-section 48 has a hub 51, rotatably mounted upon a stationary tubular shaft 52, held in a stationary support or sleeve 53, as shown. The casing-section 49 has a tubular hub 54, which is rotatably mounted upon the tubular driving shaft 43, the same projecting into the pulley-casing or member 47 and terminating at a point 55, the stationary shaft 52 terminating adjacent the point 55, but having no direct connection with the shaft 43. Arranged within the casing-section 48 is a planetary gear-carrier 56, having a tubular hub 57, rotatably mounted upon the stationary shaft 52. Clutch means 58, identical with that described in connection with each of the pinions 17, 18 and 19, is carried by the hub 57 and stationary shaft 52, to lock the hub 57 to the shaft 52, when desired. Rotatably connected with the planetary gear-carrier 56 by means of stub-shafts 59, are planetary gears 60 (see Fig. 2), engaging an outer annular gear 61, formed upon the interior of the casing-section 49, and an inner control or sun gear 62, rotatably mounted upon the shaft 43. This sun gear may be locked to the shaft 43 to rotate therewith by clutch means 63, carried by the control gear 62 and the shaft 43, and identical with the clutch means shown and described in connection with each of the pinions 17, 18 and 19. The hub 54 of the casing-section 49 and the shaft 43 are provided with clutch means 64, identical with the clutch means shown in connection with each of the pinions 17, 18 and 19, whereby the casing-section 49 may be locked to the shaft 43 for rotation therewith.

Longitudinally movably mounted within the shaft 43 is a shifting rod 65, carrying stop rings or elements 66 and 67, adapted to engage with the left end of the stationary shaft 52 and a bearing 68, as shown. The shaft 65 has a reduced portion 69, disposed inwardly of the clutch means 58, 63 and 64, and this reduced portion is provided with expanding members 70 and 71, adapted when the shaft 65 is shifted to the left to engage with the clutch means 58 and 63 to simultaneously lock the planetary gear-carriers 56 to the stationary shaft 52 and the control gear 62 to the shaft 43, while the clutch means 64 is inactive. When the shaft 65 is moved to the right, the expanding members 70 and 71 engage clutch means 63 and 64 respectively, rendering the same inactive whereby the hub 54 is locked to shaft 43 and control gear 62 is also locked to shaft 43. When clutch means 63 and 64 are active, the driving member or casing 47 rotates forwardly, but when clutch means 58 and 63 are active, the driving member 47 rotates in a reverse direction.

The means for shifting the rods 30 and 65, comprises trunnion carrying members or sleeves 72 and 73, which are longitudinally movably mounted upon the shafts 30 and 65, respectively, as shown. These trunnion carrying sleeves are identical, each being provided, as more clearly shown in Fig. 5, with oppositely arranged trunnions 74. The sleeve is provided with an axial opening 75 to receive the shaft 65 and a vertical passage or recess 76, within which is mounted a vertically movable clutch or lock element 77, having a forked end 78, to enter an annular groove 79, formed upon the shaft 30 or 65, as shown. The clutch element 77 is moved upwardly to engage within the annular groove 79 whereby the sleeve 73 is locked to the rod 65, by a compressible coil spring 80, fitting within a recess 81, and engaging a depending rod 82, attached to the element 77, as shown. Connected with each of the rods 82 is a wire 83, for a purpose to be described.

As more clearly shown in Fig. 4, the numeral 84 designates a relatively stationary supporting arm or bracket, to the lower end of which is pivoted, as shown at 85, a vertically swinging shifting lever 86. This shifting lever 86 is forked for providing a pair of upwardly extending arms 87 and 88. Each of these arms has its upper end forked, providing spaced arms 89, the upper ends of which are provided with vertical slots 90 to receive the trunnions 74. It is obvious that when the lever 86 is swung in either direction, both sleeves 72 and 73 will be shifted longitudinally. The lever 86 has an extension lever 91, rigidly attached thereto by means of bolts 92, or the like, as shown.

Pivotally connected with the lever 86, as shown at 93, is a vertically swinging guide lever 94, having the wires 83 attached thereto, as shown at 95. Near its lower end, the extension lever 91 (see Fig. 6) is provided with a transverse opening 96, receiving a vertically swinging transverse lever 97, to the ends of which are connected the wires 83. This lever 97 is rigidly connected with a rock-shaft 98, journaled through an opening in the extension lever 91, as shown. A hand wheel or knob 99 is attached to the forward end of the bolt 98, while a clamping nut 100 has screw-threaded engagement with the opposite end thereof, which may be adjusted to regulate the turning movement of the rock-shafts 99, whereby the same may remain in the desired position when moved thereto. It is obvious that any other suitable means may be employed to hold or positively lock the rock-shaft 98 in the positive position. By turning the hand wheel 99 in the desired direction either of the elements 77 may be moved to the elevated position, to lock the corresponding trunnion carrying sleeve to its shifting shaft, while the other lock element is simultaneously moved downwardly, whereby the other trunnion carrying sleeve is free to move longitudinally upon its shifting shaft.

The operation of the apparatus is as follows: The pulley 16 is continuously rotated in one direction, by any suitable means, while the power is distributed from or by the element or pulley-casing 47, as by the same driving a belt, while other means may be employed. When the several parts of the apparatus assume the position shown in Fig. 1, the member 47 will be driven at reverse intermediate speed. The intermediate speed pinion 18 is now locked to shaft 15 for rotation therewith, the expanding member 36 engaging with the clutch means of the pinion 18. The rotation of the shaft 15 is accordingly transmitted to the pinion 45 through the pinion 18. This drives the shaft 43 at intermediate speed. The clutch means 64 being inactive, rotation of the shaft 43 cannot be imparted to the casing section 49 through the clutch means 64 and hub 54. The clutch means 58 being active, the planetary gear-carrier 56 is held against rotation, whereby the planetary gears 60 are rotated upon their axes, by the control gear 62, which is locked to the shaft 43 for rotation therewith. The planetary gears 60 engaging the annular gear or pinion 61 rotates the element or pulley-casing 47 in a reverse direction. The element 47 may be driven at the three speeds while operating in reverse, by shifting the rod 30 to render the clutch means of either of the gears 17, 18 and 19 active, as hereinabove described. When it is desired to shift the rod 30 in either direction, for the purpose stated, the hand wheel 99 (see Fig. 4) is turned to the left or counter-clockwise, whereby lock element 77 of sleeve 72 moves upwardly, while lock element 77 of sleeve 73 moves downwardly. Sleeve 72 is now locked to the rod 30 for longitudinally shifting the same, while sleeve 73 is free to slide upon rod 65. When it is desired to change the direction of rotation of the element or pulley-casing 47, which in the present instant would be from reverse to forward, the shifting lever 68 is first swung to the neutral position, bringing the rod 30 to the neutral position, whereby all of the pinions 17, 18 and 19, are rendered idle upon the driving shaft 15. The hand wheel 99 is turned to the right to bring the lever 94 to the neutral position, whereby both of the sleeves 72 and 73 slide upon shafts 30 and 65 respectively. The shifting lever 86 is now swung to the left, whereby lock element 77 of sleeve 73 is arranged in proximity to groove 79 of shaft 65, and upon further turning movement of the hand wheel 99 to the right, lock element 77 enters the same, whereby sleeve 73 is locked to the shaft 65, and sleeve 72 is free to slide upon rod 30. The shifting lever 86 is now swung to the right effecting a corresponding movement of the rod 65, whereby expanding members 70 and 71 engage the clutch means 63 and 64 respectively. These clutch means lock the casing section 49 and control gear 62 with the shaft 43 for rotation therewith, while the planetary gear-carrier is released, whereby the element 47 is rotated forwardly. It is obvious that the shifting lever 86 may now be disconnected from the rod 65 and again employed to shift the rod 30 for changing the speed.

It is to be understood that the form of my invention herewith shown and described is to be taken as a preferred example of the same, and that various changes, in the shape, size, and arrangement of parts may be resorted to without departing from the spirit of the invention or the scope of the subjoined claims.

Having thus described my invention, I claim:—

1. In apparatus of the character described, the combination with a pair of approximately parallel longitudinally movable rods, of a reversible power distributing mechanism provided with an opening to receive one longitudinally movable rod and having means to operate it by and upon the movement of such rod to cause it to operate in opposite directions, a variable speed gearing to drive the power distributing mechanism and provided with an opening to receive the other rod and having means operated by and upon the longitudinal movement of such rod to cause it to operate in different speeds, and means to move the rods longitudinally.

2. In apparatus of the character described, the combination with a pair of longitudinally movable rods arranged approximately parallel, of common means to alternately move the rods longitudinally in either direction, a reversible power distributing mechanism having means operated by and upon the movement of one rod longitudinally to cause it to operate in opposite directions, and variable speed gearing to drive the power distributing mechanism and having means operated by and upon the longitudinal movement of the other rod to cause it to operate in different speeds.

3. In apparatus of the character described, the combination with a pair of approximately parallel longitudinally movable rods, sleeves loosely mounted upon the rods to move longitudinally thereof, an operating lever connected with the sleeves to shift them longitudinally of the rods, devices associated with the sleeves to lock them against longitudinal movement upon the rods, means to alternately move one device to the active position and the other device to the inactive position, a reversible power distributing mechanism having means operated by and upon the movement of one rod longitudinally to cause it to operate in opposite directions, and variable speed gearing to drive the power distributing mechanism and having means operated by and upon the longitudinal movement of the other rod to cause it to operate in different speeds.

4. In apparatus of the character described, the combination with a pair of longitudinally movable rods arranged approximately parallel, of sleeves loosely mounted upon the rods to move longitudinally thereof, a pivoted lever connected with the sleeves to shift them longitudinally of the rods, devices associated with the sleeves to lock them against movement upon the rods, a member pivotally connected with the lever, elements connecting the member and devices whereby upon the movement of the member in one direction one device is rendered active and the other inactive, reversible power distributing mechanism having means operated upon the longitudinal movement of one rod to cause it to operate in opposite directions, and variable speed gearing to drive the power distributing mechanism and having means operated by and upon the longitudinal movement of the other rod to cause it to operate in different speeds.

5. In apparatus of the character described, the combination with a rotatable tubular driving shaft, of a rotatable tubular driven shaft arranged near it in substantially spaced relation, a plurality of change speed gears loosely mounted upon the tubular driving shaft, a longitudinally movable rod mounted within the tubular driving shaft and provided with clutch actuating devices, clutch means arranged between the change speed gears and the tubular driving shaft and adapted to be operated by the devices, a plurality of change speed gears rigidly mounted upon the tubular driven shaft and engaging the first named change speed gears, a rotatable power distributing casing loosely mounted upon the tubular driven shaft and provided with an annular gear, a relatively stationary tubular shaft arranged in end to end relation with the tubular driven shaft, a planetary gear carrier loosely mounted upon the relatively stationary tubular shaft, planetary gears carried by the planetary gear carrier and engaging the annular gear, a control gear loosely mounted upon the tubular driven shaft and engaging the planetary gears, clutch means associated with the planetary gear carrier to lock it to the relatively stationary shaft, clutch means associated with the control gear to lock it to the driven tubular shaft, clutch means associated with the power distributing casing to lock it with the tubular driven shaft, a longitudinally movable rod mounted within the tubular driven shaft and having devices to actuate the clutch means, and means to move the rods longitudinally.

In testimony whereof I affix my signature in presence of two witnesses.

HENRY J. NOTZ.

Witnesses:
 FRANK SCHMITT,
 ELISABETH SCHMITT.